(12) United States Patent
Groe et al.

(10) Patent No.: US 7,839,231 B1
(45) Date of Patent: Nov. 23, 2010

(54) LOW POWER I/Q MODULATOR

(75) Inventors: John B. Groe, Poway, CA (US);
Michael Naone Farias, San Diego, CA (US); Reza Kaznavi, Solana Beach, CA (US)

(73) Assignee: Quintic Holdings, Santa Clara, CA (US)

( * ) Notice: Subject to any disclaimer, the term of this patent is extended or adjusted under 35 U.S.C. 154(b) by 170 days.

(21) Appl. No.: 12/330,446

(22) Filed: Dec. 8, 2008

Related U.S. Application Data

(60) Provisional application No. 61/012,005, filed on Dec. 6, 2007.

(51) Int. Cl.
*H04L 27/34* (2006.01)

(52) U.S. Cl. .................. 332/103; 332/145; 332/149; 455/108; 375/269; 375/298; 375/300

(58) Field of Classification Search .................. 332/103, 332/145, 149; 455/108; 375/269, 298, 300
See application file for complete search history.

(56) References Cited

U.S. PATENT DOCUMENTS

| | | |
|---|---|---|
| 2009/0225903 A1* | 9/2009 | van Waasen ................. 375/316 |
| 2009/0270054 A1* | 10/2009 | Ridgers et al. ............... 455/110 |

* cited by examiner

*Primary Examiner*—Robert Pascal
*Assistant Examiner*—James E Goodley
(74) *Attorney, Agent, or Firm*—Blairtech Solution LLC

(57) ABSTRACT

Apparatus and methods for improving the performance of a modulator, typically in an I/Q modulation system, are described. Input I and Q current modulation signals may be processed to generate a sign signal and a magnitude signal, with the magnitude signal selectively applied to the inputs of a mixer based on the sign signal so as to generate respective I and Q modulation signal components. These may then be combined to generate a composite modulation signal.

32 Claims, 5 Drawing Sheets

Low Power I/Q Modulator

I/Q Modulator
(Prior Art)

Double Balanced Mixer
(Prior Art)

Transmit Signal Plotted
on Complex Plane

Extended Mixer with Signed Input

Extended Mixer with Signed Input

Signal Conditioning for Extended Mixers

Extended Mixer with Signed Input and Offset Current

Low Power I/Q Modulator

LOW POWER I/Q MODULATOR

CROSS-REFERENCE TO RELATED APPLICATIONS

This application claims priority under 35 U.S.C. §119(e) to U.S. Provisional Patent Application Ser. No. 61/012,005, entitled LOW POWER I/Q MODULATOR, filed on Dec. 6, 2007. This application is also related to U.S. Utility patent application Ser. No. 11/369,897, entitled LINEAR WIDEBAND PHASE MODULATION SYSTEM, filed Mar. 6, 2006. The content of each of these applications is hereby incorporated by reference herein in its entirety for all purposes.

FIELD OF THE INVENTION

The present invention relates generally to radio transmitters using I/Q modulation. More particularly but not exclusively, the present invention relates to apparatus and methods for improving the efficiency of radio transmitters using I/Q modulation.

BACKGROUND

Radio transmitters generate the modulated signals required for wireless communications using modulation techniques such as QPSK, 8-PSK, 16-QAM, 64-QAM, and OFDM. These techniques vary the amplitude, phase, and/or frequency of the transmitter's RF carrier.

An I/Q modulator provides a convenient and straightforward method to realize the modulation. It uses quadrature signals to drive double-balanced mixers that combine to form the transmit signal. Unfortunately, the mixers generate noise and operate inefficiently. This causes problems in low-noise, low-power applications. It would therefore be advantageous to reduce the mixer's current consumption while lowering its output noise level.

SUMMARY

In one or more embodiments of the present invention, apparatus and methods for lowering the current consumption and reducing the noise of an I/Q modulator are described.

In one aspect, the present invention relates to an apparatus for use in a modulator comprising a first sign circuit configured to generate a first sign signal representing the sign of a first current signal component of a modulation signal provided to said modulator, a first magnitude circuit configured to generate a first magnitude signal representing the magnitude of the first current signal component, and a first input selection circuit including a first switching circuit configured to selectively apply the first magnitude signal to one of a first input and a second input of a first mixer, wherein said first input and said second input are selected based on said first sign signal.

In another aspect, the present invention relates to a modulator comprising a first mixer, a second mixer, an in-phase (I) processing circuit coupled to the first mixer comprising a first sign circuit configured to generate a first sign signal representing the sign of an I current signal component provided to said modulator, a first magnitude circuit configured to generate a first magnitude signal representing the magnitude of the I current signal component, and a first input selection circuit including a first switching circuit configured to selectively apply the first magnitude signal to one of a first input and a second input of the first mixer, wherein said first input and said second input are selected based on said first sign signal, and a quadrature (Q) processing circuit coupled to the second mixer comprising a second sign circuit configured to generate a second sign signal representing the sign of a Q current signal component provided to said modulator, a second magnitude circuit configured to generate a second magnitude signal representing the magnitude of the Q current signal component, and a second input selection circuit including a first switching circuit configured to selectively apply the second magnitude signal to one of a first input and a second input of the second mixer, wherein said first input and said second input are selected based on said second sign signal.

In yet another aspect, the present invention relates to a method for enhancing the performance of a modulator comprising generating a first sign signal representing the sign of a first current signal component of a modulation signal provided to the modulator, generating a first magnitude signal representing the magnitude of the first current signal component, and selectively applying the first magnitude signal to one of a first input and a second input of a first mixer, wherein said first input and said second input are selected based on said first sign signal.

Additional aspects are described below with respect to the appended drawings.

BRIEF DESCRIPTION OF THE DRAWINGS

The following is a brief description of the drawings wherein.

DETAILED DESCRIPTION

Figure 1:
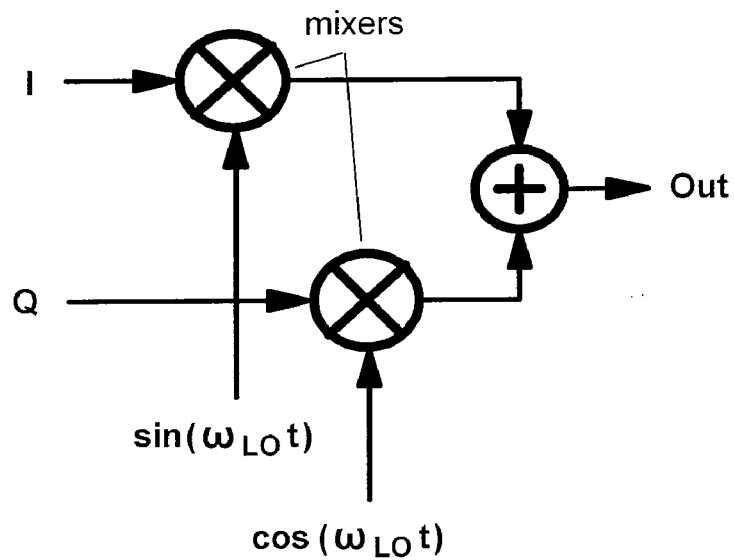
FIG. 1 shows a diagram of an I/Q modulator.

An I/Q (In Phase/Quadrature) modulator is shown in FIG. 1. It uses a pair of mixers driven by orthogonal or quadrature signals to generate the amplitude, phase, and/or frequency modulated transmit signal.

Figure 2:
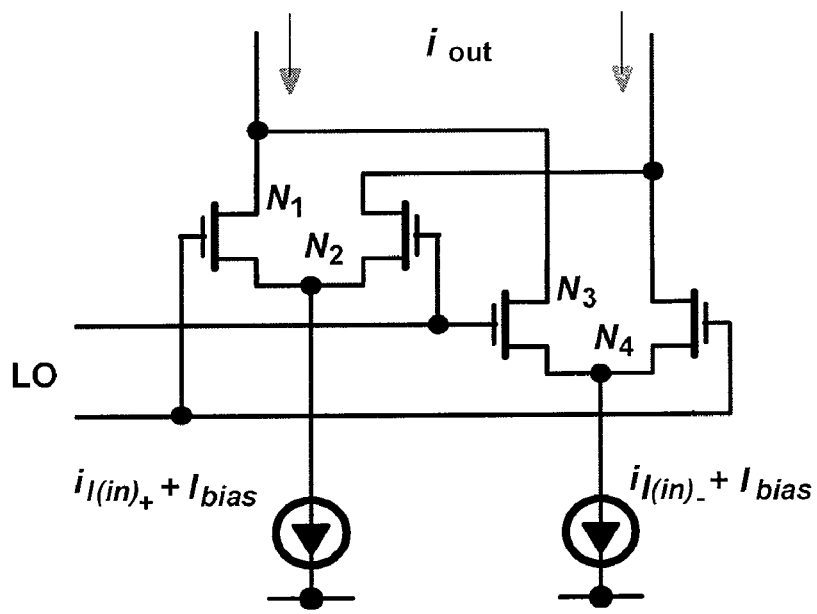
FIG. 2 shows a diagram of the double-balanced mixer generally used in the I/Q modulator.

In typical implementations, the mixers in the I/Q modulator rely on a double-balanced structure as shown in FIG. 2. The circuit is configured to feed a complementary current representing the input signal to the differential pairs formed by transistors $N_1$-$N_4$. The input signal may be formed by a D/A converter, current mirror, or transconductance amplifier. The LO signal drives these differential pairs, creating a commutating action that translates the signal current to the RF carrier frequency.

Figure 3:
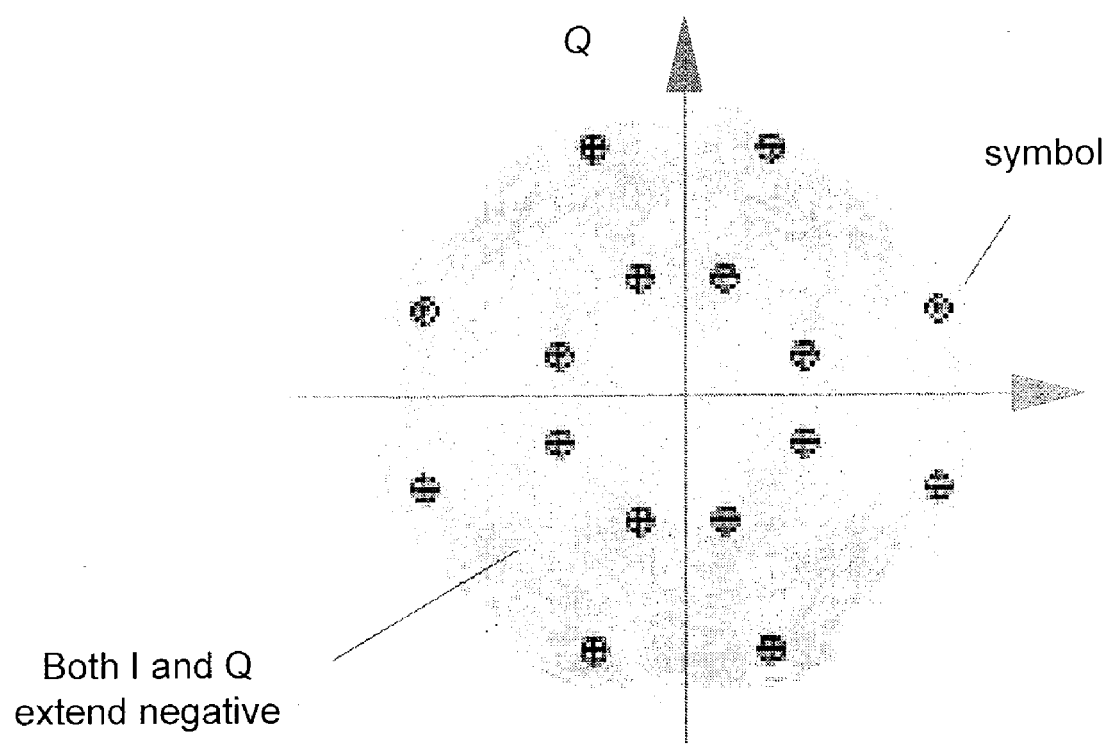
FIG. 3 shows the signal trajectory for a complex transmit signal.

The input I and Q signals applied to the mixers in the I/Q modulator must be bipolar to realize any arbitrary phase. This is because these signals represent the complex modulation translated to I and Q coordinates as shown in FIG. 3. Since the mixer processes only positive signals, each bipolar signal maps to $$i_{I(in)} \to i_{I(in)} + I_{bias} \quad i_{Q(in)} \to i_{Q(in)} + I_{bias}$$

in the current domain, where $I_{bias}$ represents the dc offset needed to keep $i_{I(in)}$ and $i_{Q(in)}$ positive. As such, the bias is typically set to equal the maximum peak value of either input signal $i_{I(in)}$ or $i_{Q(in)}$. Unfortunately, this dc level mixes with the LO signal and effectively leaks the LO signal to the mixer's output. To avoid this problem, a differential signal may be used where $$i_{I(in)} = \Delta i_{I(in)} \to (i_{I(in)+} I_{bias}) - (i_{I(in)-} + I_{bias}) = i_{I(in)+} - i_{I(in)-}$$

Without an input signal, the two differential pairs operate at the same current level. Since their outputs are cross-coupled, the two outputs cancel and the net output ideally equals zero.

The differential input signal results in a constant current level since $$i_{I(in)+} + i_{I(in)-} = i_{total} = 2I_{bias}$$

This means that the current consumption remains fixed. Moreover, the output level then varies with the peak-to-average ratio of the input signal. In other words, the output power falls as the peak-to-average ratio increases.

Figures 4A, 4B:
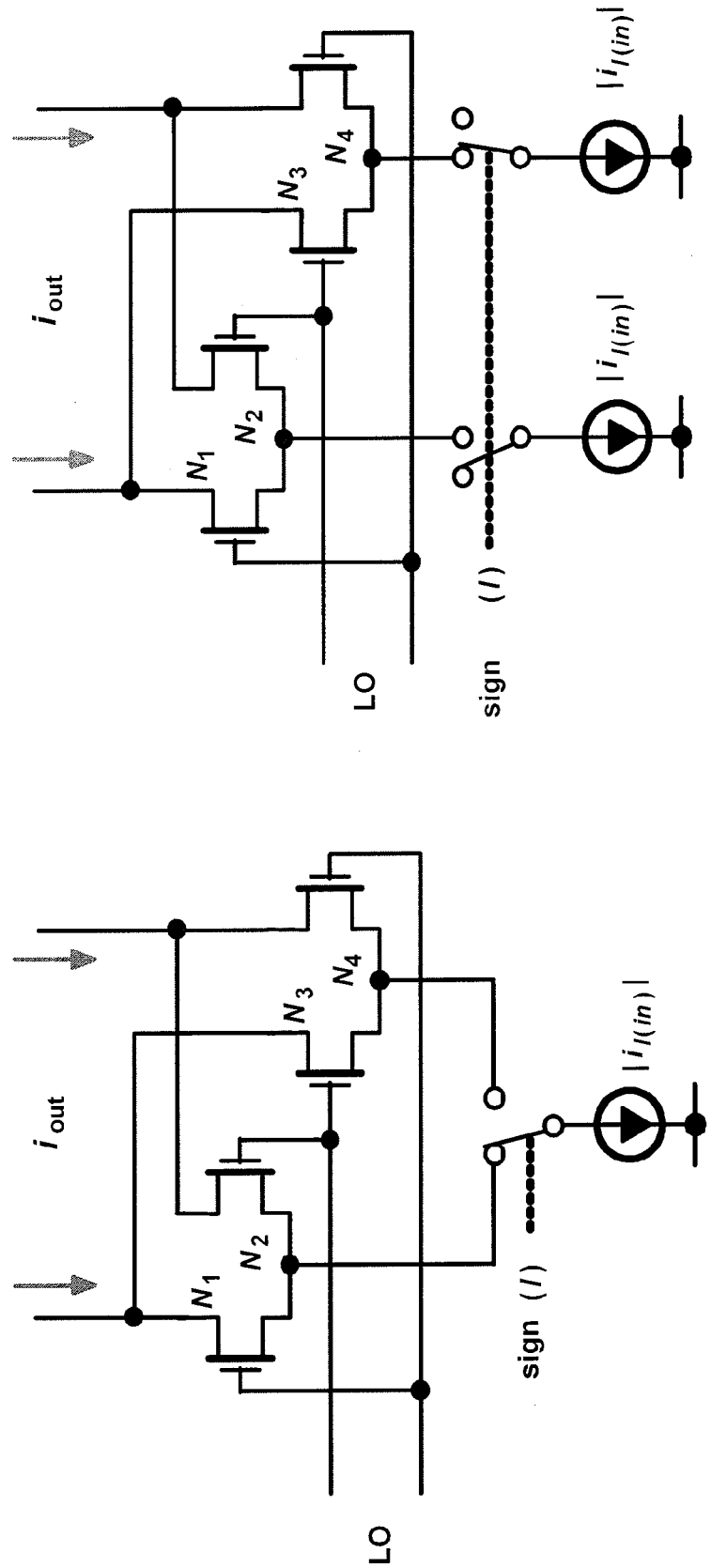
FIG. 4(a) shows an embodiment of an extended mixer, in accordance with aspects of the present invention.
FIG. 4(b) shows an alternate embodiment of an extended mixer, in accordance with aspects of the present invention.

In accordance with aspects of the present invention, it is possible to realize the sign inversion without using the traditional approach based on differential signals. An embodiment of this approach is illustrated in FIG. 4(a). Here, the circuit is configured to invert the input signal. Ideally, only one of the differential pairs operates at any given time depending on the polarity on the input signal. Since the outputs of the two differential pairs are cross-coupled, their outputs are inherently opposite. As a result, switching the active signal between the two differential pairs inverts the input signal and consequently produces the desired output signal. An alternative approach is illustrated in FIG. 4(b).

Figure 5:
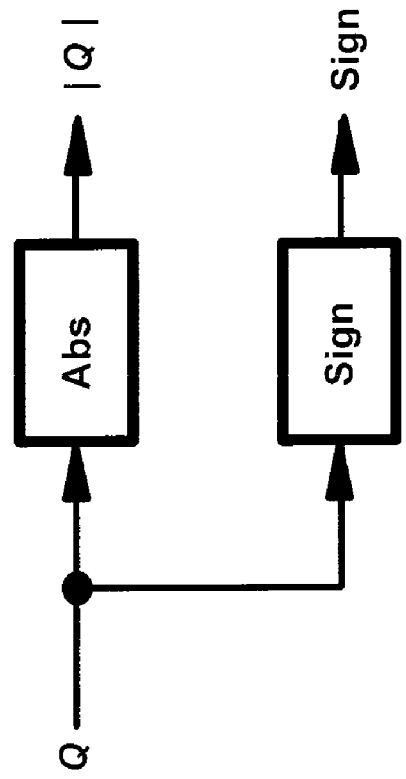
FIG. 5 shows an embodiment of signal conditioning applied to an input before it is applied to an extended mixer, in accordance with aspects of the present invention.
Figure 5:
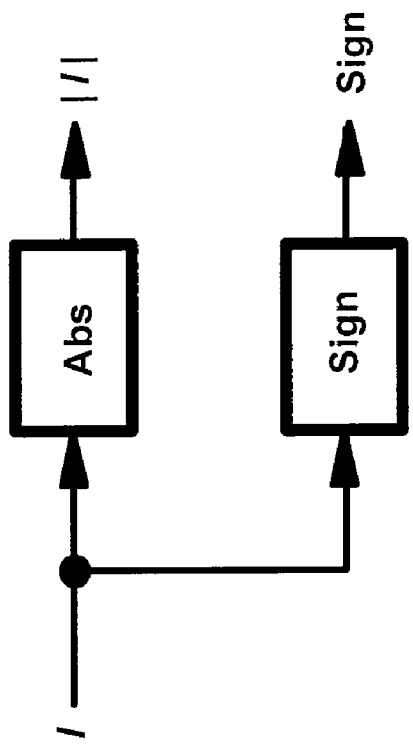

An embodiment of signal conditioning associated with the extended mixer is illustrated in FIG. 5. As shown, the input I and Q signals may each be processed to extract a magnitude signal and a sign signal. The sign signal may then be used to selectively apply the magnitude signal to one of the mixer differential inputs such as is shown in FIGS. 4(a) and 4(b), with selection based on whether the sign is positive or negative.

As a result of this processing, the applied input now equals the absolute value of the signal according to $$i_{I(in)} = |i_{I(in)}|$$

As a result, the current consumption of the mixer tracks the amplitude of the input signal and thereby varies with its peak-to-average. Consequently, the current consumption may decrease, in some cases dramatically. Furthermore, the noise may also drop since it also tracks the operating current.

Figure 6:
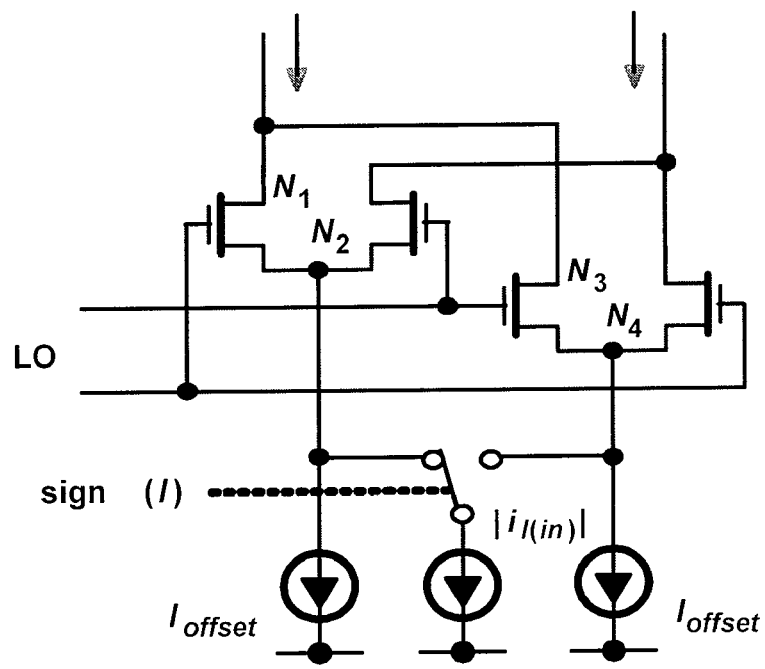
FIG. 6 shows an embodiment of an extended mixer with offsets added to keep both differential pairs active, in accordance with aspects of the present invention.

In some embodiments, better performance results may be obtained with a small offset added to both the positive and negative input signals, with the net output equal to zero. The offset currents $I_{offset}$ keep both differential pairs biased and active. One embodiment of this approach is illustrated in FIG. 6.

Figure 7:
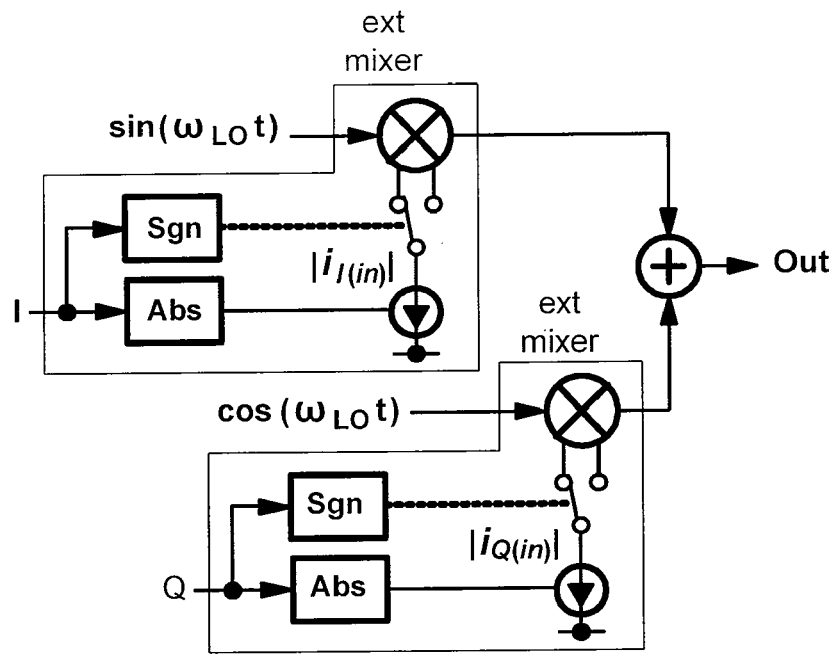
FIG. 7 shows a diagram of an embodiment of a low-power I/Q modulator based on an extended mixer, in accordance with aspects of the present invention.

In an exemplary embodiment, a low-power I/Q modulator includes signal conditioning circuitry for both I and Q signal inputs, and uses identical extended mixers as shown in FIG. 7. This implementation may advantageously provide the same functionality as a traditional I/Q modulator, while lowering RMS current and the noise floor.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An apparatus for use in a modulator, comprising:
    a first sign circuit configured to generate a first sign signal representing the sign of a first current signal component of a modulation signal provided to said modulator;
    a first magnitude circuit configured to generate a first magnitude signal representing the magnitude of the first current signal component; and
    a first input selection circuit including a first switching circuit configured to selectively apply the first magnitude signal to one of a first input and a second input of a first mixer, wherein said first input and said second input are selected based on said first sign signal.

2. The apparatus of claim 1 wherein said first current signal component is an In-Phase (I) signal component.

3. The apparatus of claim 1 wherein said first current signal component is a Quadrature (Q) signal component.

4. The apparatus of claim 1 wherein said first mixer comprises a double balanced mixer.

5. The apparatus of claim 4 wherein said double-balanced mixer comprises first and second differential transistor pairs configured to receive a local oscillator (LO) signal.

6. The apparatus of claim 1 wherein the first switching circuit includes a first switch configured to apply the first magnitude signal to one of the first mixer input or the second mixer input responsive to a value of the first sign signal.

7. The apparatus of claim 6 further comprising a first offset circuit coupled to the first input of the first mixer and a second offset circuit coupled to the second input of the first mixer.

8. The apparatus of claim 1 wherein the first switching circuit includes a first switch and a second switch; wherein said first switch is configured to selectively apply the first magnitude signal to the first input of the mixer and the second switch is configured to selectively apply a second signal representing the first magnitude to the second input of the mixer based on a value of the first sign signal.

9. The apparatus of claim 8 wherein said first switch and said second switch are configured in tandem to alternate application of said first magnitude signal and said second signal to the first and second mixer inputs respectively.

10. The apparatus of claim 9 further comprising a first offset circuit coupled to the first input of the first mixer and a second offset circuit coupled to the second input of the first mixer.

11. The apparatus of claim 1 wherein said first current signal component comprises a in-phase (I) current signal component and said apparatus further comprises:
    a second sign circuit configured to generate a second sign signal representing the sign of a quadrature (Q) current signal component of said modulation signal;

a second magnitude circuit configured to generate a second magnitude signal representing the magnitude of the Q current signal component; and a second input selection circuit including a second switching circuit configured to selectively apply the second magnitude signal to one of a first input and a second input of a second mixer, wherein said first input and said second input are selected based on said second sign signal.

12. The apparatus of claim 1 wherein said first current signal component is provided by a constant current source.

13. The apparatus of claim 12 wherein said constant current source comprises a current mirror circuit.

14. The apparatus of claim 12 wherein said constant current source comprises a digital to analog (D/A) converter circuit.

15. A modulator comprising:
a first mixer;
a second mixer;
an in-phase (I) processing circuit coupled to the first mixer comprising:
a first sign circuit configured to generate a first sign signal representing the sign of an I current signal component provided to said modulator;
a first magnitude circuit configured to generate a first magnitude signal representing the magnitude of the I current signal component; and
a first input selection circuit including a first switching circuit configured to selectively apply the first magnitude signal to one of a first input and a second input of the first mixer, wherein said first input and said second input are selected based on said first sign signal; and
a quadrature (Q) processing circuit coupled to the second mixer comprising:
a second sign circuit configured to generate a second sign signal representing the sign of a Q current signal component provided to said modulator;
a second magnitude circuit configured to generate a second magnitude signal representing the magnitude of the Q current signal component; and
a second input selection circuit including a first switching circuit configured to selectively apply the second magnitude signal to one of a first input and a second input of the second mixer, wherein said first input and said second input are selected based on said second sign signal.

16. The modulator of claim 15 wherein said first mixer and said second mixer comprise double balanced mixers.

17. The modulator of claim 16 wherein said double-balanced mixers comprise first and second differential transistor pairs configured to receive a local oscillator (LO) signal.

18. The modulator of claim 15 wherein the first switching circuit of the first input selection circuit includes a first switch configured to apply the first magnitude signal to one of the first mixer input or the second mixer input of the first mixer responsive to a value of the first sign signal; and Wherein the first switching circuit of the second input selection circuit includes a first switch configured to apply the second magnitude signal to one of the first mixer input or the second mixer input of the second mixer responsive to a value of the second sign signal.

19. The modulator of claim 18 further comprising a first offset current circuit coupled to the first mixer circuit and a second offset circuit coupled to the second mixer circuit and wherein said first offset current circuit and said second offset current circuits are configured to provide one or more current offset signals to one or more inputs of the first mixer and the second mixer.

20. The modulator of claim 15 wherein the first switching circuit of the first input selection circuit includes a first switch and a second switch and wherein said first switch is configured to selectively apply the first magnitude signal to the first input of the first mixer and the second switch is configured to selectively apply a second signal representing the first magnitude to the second input of the first mixer responsive to a value of the first sign signal; and wherein the first switching circuit of the second input selection circuit includes a first switch and a second switch and wherein said first switch is configured to selectively apply the second magnitude signal to the first input of the second mixer and the second switch is configured to selectively apply a second signal representing the second magnitude to the second input of the second mixer responsive to a value of the second sign signal.

21. The modulator of claim 20 further comprising a first offset current circuit coupled to the first mixer circuit and a second offset circuit coupled to the second mixer circuit and wherein said first offset current circuit and said second offset current circuits are configured to provide one or more current offset signals to one or more inputs of the first mixer and the second mixer.

22. The modulator of claim 15 further comprising an output circuit coupled to said first and said second mixers, wherein said output circuit is configured to combine the output of said first and said second mixers to generate a combined output signal.

23. A method for enhancing the performance of a modulator, comprising:
generating a first sign signal representing the sign of a first current signal component of a modulation signal provided to the modulator;
generating a first magnitude signal representing the magnitude of the first current signal component; and
selectively applying the first magnitude signal to one of a first input and a second input of a first mixer, wherein said first input and said second input are selected based on said first sign signal.

24. The method of claim 23 wherein said first current signal component is an In-Phase (I) signal component.

25. The method of claim 23 wherein said first current signal component is a Quadrature (Q) signal component.

26. The method of claim 23 wherein said first mixer comprises a double balanced mixer.

27. The method of claim 23 wherein said selectively applying the first magnitude signal comprises switching the first magnitude signal to one of the first mixer input or the second mixer input responsive to a value of the first sign signal.

28. The method of claim 27 further comprising providing a first current offset signal to the first input of the first mixer input and a second current offset signal to the second input of the first mixer.

29. The method of claim 23 wherein said selectively applying the first magnitude signal comprises selectively applying the first magnitude signal to the first input of the first mixer using a first switching circuit and selectively applying a second signal representing the first magnitude to the second input of the first mixer using a second switching circuit.

30. The method of claim 29 wherein said first magnitude signal said second signals are alternately applied to said first input and the second input of the first mixer respectively by said first and said second switching circuits.

31. The method of claim 30 further comprising providing a first current offset signal to the first input of the first mixer and a second current offset signal to the second input of the first mixer.

32. The method of claim 23 wherein said first current signal component comprises an I current signal component and said method further comprises:
generating a second sign signal representing the sign of a Q current signal component of the modulation signal;
generating a second magnitude signal representing the magnitude of the Q current signal component; and
selectively applying the second magnitude signal to one of a first input and a second input of a second mixer, wherein said first input and said second input are selected based on said second sign signal.

\* \* \* \* \*